US006331585B1

(12) United States Patent
Merkel

(10) Patent No.: US 6,331,585 B1
(45) Date of Patent: Dec. 18, 2001

(54) FORMULATIONS FOR MAKING PROTECTIVE PAINTS AND COATINGS

(76) Inventor: Michael Merkel, Auenstr. 3, 95185 Gattendorf (DE)

(*) Notice: Subject to any disclaimer, the term of this patent is extended or adjusted under 35 U.S.C. 154(b) by 0 days.

(21) Appl. No.: 09/274,833

(22) Filed: Mar. 23, 1999

(51) Int. Cl.$^7$ .............. C08K 5/05; C08K 3/10; C08K 3/30; C08K 3/26

(52) U.S. Cl. ............ 524/386; 524/413; 524/423; 524/425; 523/404; 523/414

(58) Field of Search .................. 524/386, 413, 524/423, 425; 523/404, 414

(56) References Cited

U.S. PATENT DOCUMENTS

| | | | |
|---|---|---|---|
| 3,970,608 | * | 7/1976 | Furukawa et al. ............ 526/283 |
| 4,067,838 | * | 1/1978 | Hayashi et al. ............ 523/404 |

OTHER PUBLICATIONS

Alger, M "Polymer Science Dictionary," Second ed., London, Chapman & Hall, p. 234, 1997.*

* cited by examiner

Primary Examiner—Kriellion Sanders
(74) Attorney, Agent, or Firm—Mathews, Collins, Shepherd & Gould, P.A.

(57) ABSTRACT

The invention embraces a formulation to be combined with a resin and a hardener to produce a paint mixture useful for coating concrete and metal surfaces, such as aluminum, zinc, stainless steel, and steel. With the inventive formulation, the pot-life of the paint mixture may be extended to up to about eight hours, allowing for a much greater time period during which the paint, after mixing, can be applied to a surface being coated. The formulation comprises a mixture of a defoamer; titanium dioxide ($TiO_2$); at least one of barite ($BaSO_4$) or calcite ($CaCO_3$); at least one of 1,2-propyleneglycol (propane-1,2-diol), a corrosive-inhibitor, such as L-4, and a retarder such as LOXANOL™; and a thickener. Other contemplated ingredients include slate, water, colorants, and dispersing additives.

16 Claims, No Drawings

FORMULATIONS FOR MAKING PROTECTIVE PAINTS AND COATINGS

FIELD OF THE INVENTION

This invention relates to a formulation useful in making paints or coatings, and more particularly, to a formulation that may be mixed with a resin and hardener to extend the pot-life of the paint mixture. The invention further relates to paints and coatings made with the inventive formulation.

BACKGROUND OF THE INVENTION

There is a continuing need for paints and coatings that are anti-corrosive, e.g., that are capable of protecting the surfaces to which they are applied from deterioration or degradation. The demand for protective paints and coatings is increasing with a growing awareness of adverse affects caused by environmental factors, such as air pollution, acid rain, or the effects of UV rays from the sun.

Typically, paints applied at construction sites, such as in coating concrete and metal surfaces (aluminum, steel, and zinc), are prepared on-site. These paints are prepared by mixing a hardener with a resin, with the mixing being done at the construction site. The mixing is done on-site because the pot-life of the paints once mixed is relatively short, that is, within a period of about forty minutes, the paint mixture will harden or degrade. This places constraints on workers and often causes a waste of resources, because if the paint mixture is not quickly applied to the surface being coated, it will be wasted. There are additional drawbacks with resin and hardener paint mixtures in use. For example, alcoholic solvents have been needed to make the paints water soluble, which is disadvantageous for environmental reasons, and relatively large percentages of water have been required to adequately dissolve the hardener, resin and other fillers. Thus, there is a continuing need for improved formulations for making paints and coatings having anti-corrosive properties, where the pot-life of the paints once prepared is extended for longer periods of time.

SUMMARY OF THE INVENTION

Summarily, the invention embraces a formulation to be mixed with a resin and a hardener so that when the resin and hardener are combined to form a paint mixture, e.g., at a construction site, the pot-life of the paint mixture is increased, thereby expanding the time period during which the paint mixture may be applied to the surface being coated. The formulation comprises a combination of a defoamer, titanium dioxide ($TiO_2$), at least one of barite (BaSO4) or calcite ($CaCO_3$), at least one of 1,2-propyleneglycol (propane-1,2-diol) or a corrosive-inhibitor, such as L-4™, and a thickener. Other contemplated ingredients include slate, water, colorants, and dispersion additives.

DETAILED DESCRIPTION OF THE INVENTION

The invention embraces a formulation which is intended to be used as a primer or filler in making paints and coatings. It is anticipated the formulation will be combined with a resin and a hardener to produce a paint mixture useful for coating concrete and metal surfaces, such as aluminum, zinc, stainless steel, and steel. The mixture also may be applied to fiber glass and powder coatings. The formulation is combined with either the resin or the hardener, and the resin and hardener are then mixed together to form the paint mixture. With the inventive formulation, the pot-life of the paint mixture may be extended to up to about eight hours, allowing for a much greater time period during which the paint, after mixing, can be applied to the surface being coated. The inventive formulation may be mixed with the hardener before the paint products are brought to the construction site, and then the hardener with the formulation added to the resin. Conversely, the formulation may be added to the resin, with the hardener added thereafter. A further advantage of this invention is that toxic solvents, e.g., reactive thinners based on fatty alcohols, are avoided.

More particularly, applicant has discovered that a formulation having as its primary components one or more of titanium dioxide, barite, calcite, propylene glycol, LOXANOL™, and a thickener is advantageous to be added with either a resin or a hardener, with the resin and hardener then mixed together to form a paint mixture for coating a surface. The resultant paint mixture has a relatively long pot life, e.g., substantially greater than the pot-life of existing paints and greater than two hours and up to about eight hours, and as applied to certain surfaces (e.g., aluminum and zinc), it has anti-corrosive properties. The term "pot life" is used herein to describe the time period during which the paint mixture effectively may be used once the resin and hardener have been mixed, that is, the time period before the mixture hardens, coagulates, or otherwise degrades.

In one embodiment, the formulation comprises a mixture of a (1) defoamer known as FOAMASTER TCX™ or FOAMASTER 410™ which are available from HENKEL Corp. of Germany (hereinafter "Henkel"); (2) titanium dioxide ($TiO_2$); (3) at least one of barite (BaSO4) or calcite ($CaCO_3$); (4) at least one of 1,2-propyleneglycol (propane-1,2-3 diol), a corrosive inhibitor, or a retarder, such as LOXANOL DP-6™; and (5) a thickener. The formulation is then added to a resin, and the combined resin-formulation composition is added to a hardener. An advantageous resin to be used with the formulation comprises WATERPOXY 1455,™ which is a tradename for a product available from Henkel comprising a polymer based on epoxyamine adducts. Advantageously, the weight percent of the resin to the formulation comprises about 50–80 parts by weight resin to formulation. The hardener advantageously comprises WATERPOXY- 751,™ also a tradename for a product available from Henkel which comprises an epoxy polymer emulsion.

Both FOAMASTER TCX™ or FOAMASTER 410™ are tradenames of products available from Henkel. It is understood the defoamer known as FOAMASTER TCX™ comprises a mixture of aliphatic hydrocarbons and non-ionic surfactants, and the defoamer known as FOAMASTER 410™ comprises a blend of fatty acid esters, ether alcohols, and non-ionic emulgators. The defoamer should comprise up to about 0.5% by weight of the resin-formulation composition. With regard to the titanium dioxide ($TiO_2$), an advantageous source of this ingredient comprises RKB-5,™ a tradename for a product available from BAYER Corp. Titanium dioxide may comprise from about three to up to about thirty-one percent by weight of the resin-formulation composition; exemplary embodiments showing differing values for $TiO_2$ are set forth below in the examples. The barite ($BaSO_4$) or calcite ($CaCO_3$) should be added in amounts of about three to fifty parts by weight of the composition. LOXANOL DP-6™ is a tradename for a product available from Henkel, which is believed to comprise a fatty alcohol dispersion, which when used as a retarder should be present in the composition in about 0.5 percent by weight. Another advantageous corrosive-inhibitor that may be used (at approximately 0.2% by weight), comprises a product available from C.H. Erbsloeh Company, 47809 Krefeld, Germany, under the tradename L-4,™ which is based on borate and organic esters of a tertiary alcohol-amine base with synergetic additives. An advantageous thickener comprises a product sold under the tradename NOPCO DSX 1550,™ by Henkel, which comprises a polyurethanepolymer in water and butyldiglycol. The thickener should be present at about 0.1 to 1.0 percent by weight of the resin-formulation composition.

Other contemplated components of the formulation include slate, water, and colorants. A dispersing additive may be added, such as a product commonly known under the tradename DISPONIL AEP 5300,™ available from Henkel, which is believed to comprise an etherphosphate acid ester having greater than 20 percent alkylphenol polyglycolether phosphate. The dispersing additive advantageously is added in small quantities (e.g., about 0.1 parts by weight). The formulation is mixed with the resin. The temperature should be controlled and preferably maintained below 50° C., as the resin may tend to coagulate at higher temperatures. A dissolver, which is known in the field, may be used to combine the formulation and resin, with the device preferably operating at high speed. "High speed" is considered to be above 18 meters per second (e.g., referring to the speed of the revolutions for the blade or disk used in the dissolver).

The following examples represent various specific embodiments of the invention which are intended to be exemplary to aid in understanding the invention and not limiting in nature.

EXAMPLE 1

The inventive formulation having the following components is mixed with about 80 parts by weight resin:

| Formulation | |
|---|---|
| Parts by weight (approximations) | Component |
| 0.5 | Defoamer |
| 0.1 | Disponil AEP 5300 ™ |
| 0.2 | L-4 ™ corrosive inhibitor |
| 3.2 | Titanium dioxide (TiO$_2$) |
| 3.2 | Slate (floury) |
| 4.8 | Calcite (CaCO$_3$) |
| 3.2 | Barite (BaSO$_4$) |
| 0.6 | Water |
| 3.2 | Talc (Mg$_3$ (OH)$_2$Si$_4$O$_{10}$) |

As indicated previously, the defoamer is preferably FOAMASTER TCX™ or FOAMASTER 410,™ obtained from Henkel, although other defoamers may be used as well. The calcite preferably comprises M alpha, M5, and M 40 calcite in about equal quantities of each. The part-by-weight measurements may comprise approximations. The formulation is mixed with the resin at high speed for about ten to fifteen minutes, and the water is added in small amounts to regulate the viscosity. The speed of the mixing is then substantially reduced (e.g., to below 18 m/s), and a thickener of about 0.8 parts by weight (e.g., DSX 1550™ thickener), and a hardener of about 20 parts by weight are added. The hardener preferably is added just before use at a construction site. The resultant combination is useful as a primer.

EXAMPLE 2

The inventive formulation having the following components is mixed with about 50 parts by weight resin:

| Formulation | |
|---|---|
| Parts by weight (approx.) | Component |
| 0.5 | Defoamer |
| 0.1 | Disponil AEP 5300 ™ |
| 0.5 | 1,2-Propyleneglycol |
| 25.0 | Titanium dioxide (TiO$_2$) |
| 0.5 | Loxanol DP-6 |
| 26.0 | Barite (BaSO$_4$) |
| 2.7 | Water |

With this formulation, the resin is preferably WATERPOXY 1455™ from Henkel, and the defoamer is preferably a combination of FOAMASTER TCX™ and FOAMASTER 410™ mixed in a 1:1 ratio. The resin and formulation are mixed at high speed for about ten to fifteen minutes with the temperature maintained below 50° C. The speed of the mixing is then substantially reduced (e.g., to below 18 m/s), and a thickener (e.g., DSX 1550™) of about 0.5 parts by weight and a hardener of about 12.5 parts by weight are added. The resultant combination is useful as a concrete sealant.

EXAMPLE 3

The inventive formulation having the following components is mixed with about 60 parts by weight resin:

| Formulation | |
|---|---|
| Parts by weight (approx.) | Component |
| 0.5 | Defoamer |
| 0.1 | Disponil AEP 5300 ™ |
| 0.2 | L-4 ™ corrosive inhibitor |
| 31.5 | Titanium dioxide (TiO$_2$) |
| 5.1 | Water |

With this formulation, the resin is preferably WATERPOXY 1455™ from Henkel, and the defoamer is preferably FOAMASTER TCX™. After the resin and formulation are mixed at high speed, the speed of the mixing is reduced and about 0.7 parts by weight thickener (e.g., DSX 1550™) and about 15.5 parts by weight hardener are added. The resultant combination is useful as a top coat.

EXAMPLE 4

The inventive formulation having the following components is mixed with about 22 parts by weight resin and about 56 parts by weight quartz, with the resultant combination useful as a self-leveling floor system:

| Formulation | |
|---|---|
| Parts by weight (approximations) | Component |
| 0.5 | Defoamer |
| 5.4 | Titanium dioxide (TiO$_2$) |
| 0.5 | 1,2-Propyleneglycol |
| 0.5 | Loxanol DP-6 |

-continued

| Formulation | |
|---|---|
| Parts by weight (approximations) | Component |
| 11.6 | Barite (BaSO$_4$) |
| 4.5 | Water |

In this formulation, the defoamer is preferably FOAMASTER TCX™ and FOAMASTER 410™ obtained from Henkel, mixed in a 1:1 ratio. An iron oxide pigment may be added at about 0.8 to 11.0 parts by weight, which may be added with the resin and formulation at high speed. Advantageously the iron oxides are dispersed well. The thickener is added at about 0.1 parts by weight and the hardener at about 5.5 parts by weight are added. The resultant combination is useful as a self-leveling floor system.

EXAMPLE 5

An inventive formulation for a clear coat comprises mixing with 100 parts by weight resin, e.g., WATERPOXY 1455,™ 0.5 parts by weight of a defoamer, e.g., TCX, and 25 parts by weight of a hardener, e.g., WATERPOXY 751.™ A thickener, e.g., DSX 1550, ™ also may be added at about 1.0 parts by weight, and water added as needed to reduce viscosity.

It is understood that the embodiments described herein are merely exemplary and that a person skilled in the art may make variations and modifications without departing from the spirit and scope of the invention. All such variations and modifications are intended to be included within the scope of the appended claims.

I claim:

1. A coating mixture comprising a water-based solution of a resin mixed with a hardener, the coating mixture being prepared by mixing at least one of the resin and the hardener with a formulation comprising a combination of a defoamer; titanium dioxide (TiO$_2$); at least one of barite (BaSO$_4$) or calcite (CaCO$_3$); at least one of propyleneglycol, a corrosive inhibitor and a retarder; and a thickener, wherein the formulation does not comprise use of a catalyst, curing agent or organic solvent and has an extended pot life.

2. The formulation of claim 1, in which the weight percent of the resin to the formulation comprises about 20–80 parts by weight resin to formulation.

3. The formulation of claim 1, in which the formulation is mixed with the resin to form a resin-formulation composition in which the weight percent of the defoamer comprises up to about 0.5%.

4. The formulation of claim 1, in which the formulation is mixed with the resin to form a resin-formulation composition in which the weight percent of the titanium dioxide comprises from about three to up to about thirty-one percent.

5. The formulation of claim 1, in which the formulation is mixed with the resin to form a resin-formulation composition in which the weight percent of the barite or calcite comprises about three to fifty parts by weight of the composition.

6. The formulation of claim 1, in which the formulation is mixed with the resin to form a resin-formulation composition in which the thickener is included at about 0.1 to 1.0 percent by weight.

7. The formulation of claim 1, further comprising slate, water, and colorants.

8. The formulation of claim 1, in which the combination is mixed with the resin to form a resin-formulation composition and further comprising a dispersing additive added at about 0.1 parts by weight of the composition.

9. A coating mixture having an extended pot-life produced with a formulation mixed with a water-based resin, in which the coating mixture comprises about 80 parts by weight resin and about 20 parts by weight formulation, the formulation consisting essentially of about 0.5 parts by weight defoamer, about 0.1 parts by weight of a dispersion additive; about 0.2 parts by weight corrosive inhibitor; about 3.2 parts by weight titanium dioxide (TiO$_2$); about 3.2 parts by weight slate; about 4.8 parts by weight calcite (CaCO$_3$); about 3.2 parts by weight barite (BaSO$_4$); about 0.6 parts by weight water; and about 3.2 parts by weight talc, wherein the formulation does not comprise use of a catalyst or organic solvent.

10. A process for making a water-based solution for use as a coating without utilizing a curing agent or a catalyst, the process consisting essentially of:

(a) combining a water-based resin comprising an epoxy polymer emulsion with a formulation comprising a combination of a defoamer; titanium dioxide (TiO$_2$); at least one of barite (BaSO$_4$) or calcite (CaCO$_3$); water; and optionally one or more of a corrosive inhibitor, a retarder, and a thickener;

(b) mixing the combination of step (a) at high-speed and at temperatures below 50 degrees C with a hardener comprising epoxy amine polymer without use of an organic solvent, to produce the water-based solution, wherein the coating mixture may be applied to a surface to be coated and allowed to harden by evaporation of said solution without use of a catalyst or curing agent.

11. A method of applying a coating solution to a surface comprising preparing the solution according to claim 10, applying the solution to the surface to be coated, and allowing the solution to harden by evaporation without use of a catalyst or curing agent.

12. A formulation for making protective paints and coatings comprising a combination of a defoamer; titanium dioxide (TiO$_2$); at least one of barite (BaSO$_4$) or calcite (CaCO$_3$); at least on eof propyleneglycol a corrosive inhibitor and a retarder; and a thickener.

13. The formulation of claim 12, in which the formulation is mixed with the resin to form a resin-formulation composition in which the weight percent of the defoamer comprises up to about 0.5%.

14. The formulation of claim 12, in which the formulation is mixed with the resin to form a resin-formulation composition in which the weight percent of the titanium dioxide comprises from about three to up to about thirty-one percent.

15. The formulation of claim 12, in which the formulation is mixed with the resin to form a resin-formulation composition in which the weight percent of the barite or calcite comprises about three to fifty parts by weight of the composition.

16. The formulation of claim 12, in which the formulation is mixed with the resin to form a resin-formulation composition in which the thickener is included at about 0.1 to 1.0 percent by weight.

\* \* \* \* \*